(12) United States Patent
Nauka et al.

(10) Patent No.: US 12,528,247 B2
(45) Date of Patent: Jan. 20, 2026

(54) THREE-DIMENSIONAL PRINTED POLYMER OBJECTS

(71) Applicant: PERIDOT PRINT LLC, Palo Alto, CA (US)

(72) Inventors: Krzysztof Nauka, Palo Alto, CA (US); Vladek P Kasperchik, Corvallis, OR (US); Ingeborg Tastl, Palo Alto, CA (US)

(73) Assignee: Peridot Print LLC, Palo Alto, CA (US)

( * ) Notice: Subject to any disclaimer, the term of this patent is extended or adjusted under 35 U.S.C. 154(b) by 222 days.

(21) Appl. No.: 17/779,743

(22) PCT Filed: Dec. 16, 2019

(86) PCT No.: PCT/US2019/066550
§ 371 (c)(1),
(2) Date: May 25, 2022

(87) PCT Pub. No.: WO2021/126153
PCT Pub. Date: Jun. 24, 2021

(65) Prior Publication Data
US 2022/0402201 A1  Dec. 22, 2022

(51) Int. Cl.
*B29C 64/153* (2017.01)
*B33Y 70/00* (2020.01)
(Continued)

(52) U.S. Cl.
CPC ............ *B29C 64/153* (2017.08); *B33Y 70/00* (2014.12); *B33Y 80/00* (2014.12); *C09D 11/322* (2013.01); *B29K 2023/06* (2013.01); *B29K 2077/00* (2013.01); *B29K 2275/00* (2013.01); *C08K 2201/011* (2013.01)

(58) Field of Classification Search
CPC .............................. B29C 64/153; B33Y 80/00
See application file for complete search history.

(56) References Cited

U.S. PATENT DOCUMENTS

2001/0054224 A1* 12/2001 Corbin .................... B23B 27/20
                                                                     623/18.11
2005/0197431 A1   9/2005 Bredt et al.
(Continued)

FOREIGN PATENT DOCUMENTS

KR   10-2018-0050322 A   5/2018
WO     2016/068899 A1    5/2016
(Continued)

OTHER PUBLICATIONS

Vaidya, N., et al., "3D printed optics with nanometer scale surface roughness," Microsystems & Nano engineering, 2018, vol. 4:18, pp. 1-8.

*Primary Examiner* — Edmund H Lee
(74) *Attorney, Agent, or Firm* — Dierker & Kavanaugh, P.C.

(57) ABSTRACT

A three-dimensional (3D) printed object is described. The 3D printed object comprises a polymer. A surface of the 3D printed object comprises the polymer and a UV absorbing colorant. The surface has a surface area roughness Sa (arithmetical mean height) of ≤5.0 μm. A method for preparing a three dimensional (3D) printed object having a smooth surface is also described.

18 Claims, 5 Drawing Sheets

(51) Int. Cl.
*B33Y 80/00* (2015.01)
*C09D 11/322* (2014.01)
*B29K 77/00* (2006.01)
*B29K 275/00* (2006.01)

(56) References Cited

U.S. PATENT DOCUMENTS

| | | |
|---|---|---|
| 2013/0101792 A1 | 4/2013 | Pranov |
| 2015/0224539 A1 | 8/2015 | Lyons et al. |
| 2016/0243619 A1 | 8/2016 | Gothait et al. |
| 2020/0276019 A1* | 9/2020 | Shetty .................. B33Y 40/20 |

FOREIGN PATENT DOCUMENTS

| | | | |
|---|---|---|---|
| WO | WO2017032842 | * | 3/2017 |
| WO | 2017/069752 A1 | | 4/2017 |
| WO | 2018/156207 A1 | | 8/2018 |
| WO | WO2019083515 | * | 5/2019 |
| WO | 2019/147232 A1 | | 8/2019 |
| WO | WO2019199893 | * | 10/2019 |

* cited by examiner

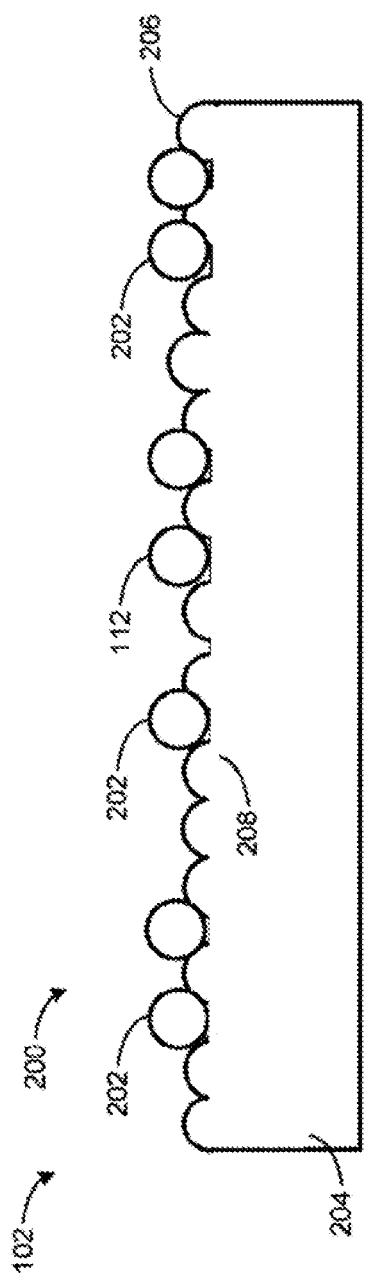
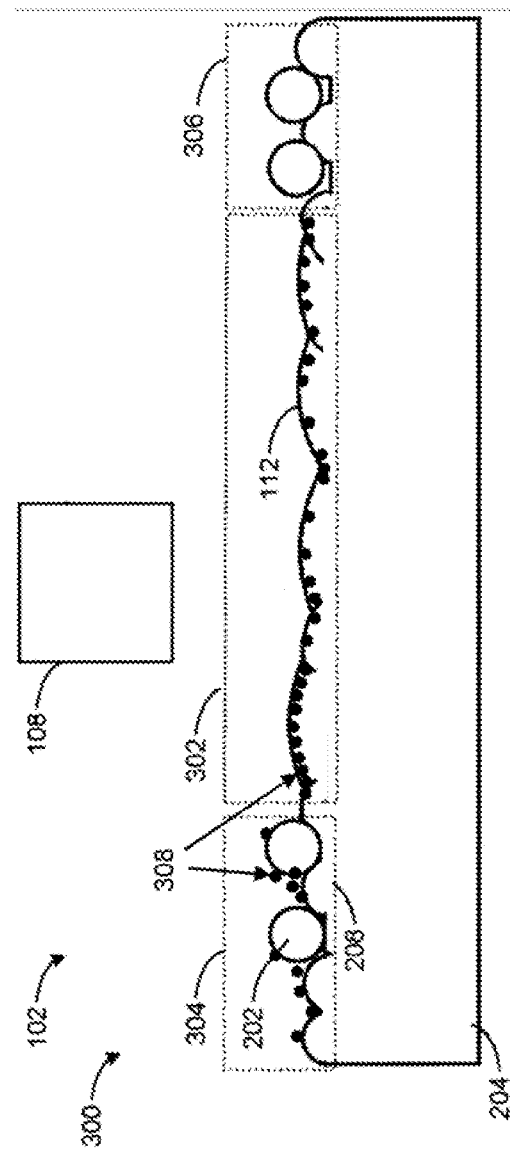

THREE-DIMENSIONAL PRINTED POLYMER OBJECTS

BACKGROUND

Three-dimensional (3D) printing is an additive printing process, which can be used to make three-dimensional solid parts from a digital model. 3D printing is often used in rapid product prototyping, mold generation, mold master generation, and short run manufacturing. For objects made of polymers, three-dimensional (3D) polymer printing is competing with other manufacturing processes, such as injection molding. Unlike injection molding, the surfaces of parts produced by the 3D printing of polymers are rough because they are covered with partially melted particles fused to the surface.

BRIEF DESCRIPTION OF THE DRAWINGS

FIG. 3 is a schematic side view of an example of a 3D printed object prior to processing with a method of the present disclosure.

FIG. 4 is a schematic side view of an example of a 3D printed object that has been processed with a method of the present disclosure.

Figure 1:
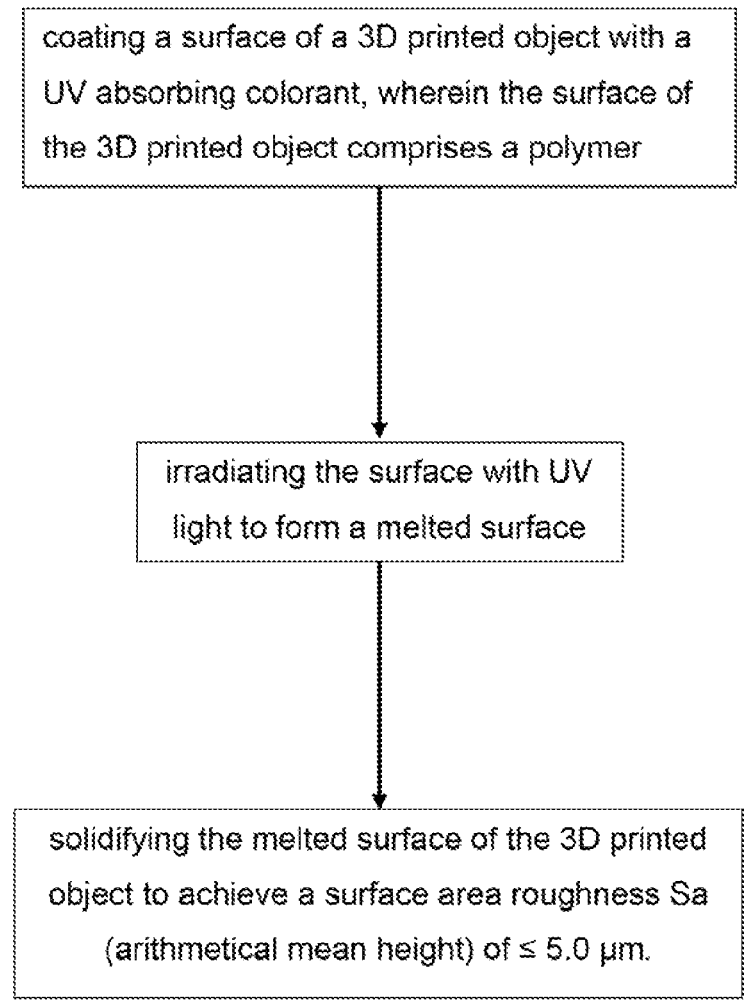
FIG. 1 is a flow chart showing a method for manufacturing a 3D printed object with a smooth surface according to an example of the present disclosure.

The figures depict several examples of the present disclosure. However, it should be understood that the present disclosure is not limited to the examples depicted in the figures

DETAILED DESCRIPTION

As used in the present disclosure, the term "about" is used to provide flexibility to an endpoint of a numerical range. The degree of flexibility of this term can be dictated by the particular variable and is determined based on the associated description herein.

Amounts and other numerical data may be expressed or presented herein in a range format. It is to be understood that such a range format is used merely for convenience and brevity and thus should be interpreted flexibly to include not just the numerical values explicitly recited as the limits of the range, but also to include individual numerical values or sub-ranges encompassed within that range as if each numerical value and sub-range is explicitly recited.

As used in the present disclosure, the term "comprises" has an open meaning, which allows other, unspecified features to be present. This term embraces, but is not limited to, the semi-closed term "consisting essentially of" and the closed term "consisting of". Unless the context indicates otherwise, the term "comprises" may be replaced with either "consisting essentially of" or "consists of".

It is noted that, as used in this specification and the appended claims, the singular forms "a", "an" and "the" include plural referents unless the context clearly dictates otherwise.

The present disclosure refers herein to a method for manufacturing a three dimensional (3D) printed object having a smooth surface and to a three-dimensional (3D) printed object.

The method for manufacturing a three dimensional (3D) printed object having a smooth surface comprises: coating a surface of a 3D printed object with a UV absorbing colorant, irradiating the surface with UV light to form a melted surface, and solidifying the melted surface of the 3D printed object. The surface of the 3D printed object comprises a polymer. The melted surface of the 3D printed object may be solidified to achieve a surface area roughness Sa (arithmetical mean height) of $\leq 5.0$ µm.

A three-dimensional (3D) printed object may be obtained from a method in the present disclosure.

The three-dimensional (3D) printed object comprises a polymer. A surface of the 3D printed object comprises the polymer and a UV absorbing colorant. The surface has a surface area roughness Sa (arithmetical mean height) of $\leq 5.0$ µm. This is the final 3D printed object as described herein below.

It is to be understood that this disclosure is not limited to the 3D printed objects or methods disclosed herein. It is also to be understood that the terminology used in this disclosure is used for describing particular examples.

The terms are not intended to be limiting because the scope of the present disclosure is intended to be limited by the appended claims and equivalents thereof.

Three-dimensional (3D) printed objects can be printed using, for example, a multi-jet fusion (MJF) process, which is a powder-based technology. 3D printed objects that are printed using a MJF process may have a relatively rough surface caused by poor surface flatness on a microscale level along with partially melted powder particles attached or adhered to the surfaces of the objects. The presence of the extra powder particles may also degrade the optical appearance of the 3D printed object because the rough surface may reflect light in all directions.

The method is for the manufacture of a three-dimensional (3D) printed object having a smooth surface. The method involves reducing the surface roughness of a 3D printed object. The term "manufacture" in this context refers to the production of the smooth surface. This term may or may not include the production of the initial 3D printed object. Thus, the method may be a method of producing a smooth surface on a 3D printed object.

The method may be a post-printing method. In the post-printing method, the 3D printed object has already been manufactured. The 3D printed object has been formed from a fused and solidified powder build material.

The methods disclosed herein provide post-print methods for treating 3D printed objects manufactured by MJF technology or by other polymer 3D printing technology.

In one example, the 3D printed object is obtained from MJF.

For convenience, the 3D printed object that has initially been manufactured by 3D printing shall be referred to herein as the "initial 3D printed object". The 3D printed object from a method of the present disclosure shall be referred to herein as the "final 3D printed object".

The 3D printed object, both the initial 3D printed object and the final 3D printed object, may comprise a polymer. A surface of the 3D printed object comprises the polymer. The surface that will be irradiated with UV light contains a polymer, which can melt upon irradiation with the UV light.

Most polymers employed in 3D printing exhibit relatively low absorption in the near IR and visible parts and in a limited UV range (340 nm to 400 nm) below the visible part of the electromagnetic spectrum. At higher photon energies that may correspond to a wavelength below 300 nm to 340 nm light irradiation may lead to the breakage of bonds within the polymer.

In general, the 3D printed object, including both the initial 3D printed object and the final 3D printed objection, has a body. The body of the 3D printed object may also comprise the polymer. Thus, the polymer may be distributed throughout the bulk, including both the body and the surface(s), of the 3D printed object.

The body or bulk of the 3D printed object comprises fused polymer particles.

The 3D printed object may, for example, comprise an amount of at least about 50 wt %/o of the polymer, such as at least about 75 wt % of the polymer, or at least about 90 wt % of the polymer. Thus, the build material used to manufacture the 3D printed object and the 3D printed object itself are primarily composed of the polymer. The 3D printed object may therefore be referred to herein as a 3D printed polymer object.

The polymer may be selected from a polyethylene (PE), a polypropylene (PP), a polybutylene terephthalate (PBT), a polyethylene terephthalate (PET), a Nylon (PA), a polyurethane (TPU), a polythalamide (TPA), a polyetherketone (PEEK), a polyphenylene sulphide (PPS) and a combination thereof.

In one example, the polymer is a crystalline form of a polyethylene (PE), a polypropylene (PP), a polybutylene terephthalate (PBT), a polyethylene terephthalate (PET), a Nylon (PA), a polyurethane (TPU), a polythalamide (TPA), a polyetherketone (PEEK), a polyphenylene sulphide (PPS) or a combination thereof.

In general, the polymer is, for example, a thermoplastic polymer.

In one example, the polymer is selected from a nylon, a thermoplastic polyurethane (TPU) and a thermoplastic polyethylene (TPE).

When the polymer is a nylon, then the nylon may, for example, be selected from nylon 12 (PA12); nylon 11 (PA11); nylon 6,6; nylon 6 (PA6); nylon 8 (PA8); nylon 9 (PA9); nylon 612 (PA612); nylon 812 (PA812); and nylon 912 (PA912). In one example, the polymer is nylon 12.

The 3D printed object may comprise the polymer with an additive, such as glass beads or fibers.

The method of the present disclosure involves coating a surface of a 3D printed object with a UV absorbing colorant.

The surface of the 3D printed object is typically a surface of the initial 3D printed object, such as an untreated or non-processed surface of the initial 3D printed object. Thus, the surface that is irradiated with UV light is a rough surface.

The surface may be an outer surface or an inner surface of the 3D printed object. The surface must, however, be able to be coated and accessible to UV light to perform the method.

Generally, the surface of the initial 3D printed object has a surface area roughness Sa (arithmetical mean height) of >5.0 µm, such as, for example, about 5.5 µm to about 15.0 µm or about 6.0 µm to about 10.0 µm. The surface area roughness Sa (arithmetical mean height) may be >10.0 µm or >15.0 µm. The initial 3D printed object has a rough surface, which is caused by the presence of partially fused powder particles and adhered powder particles from the build material at the surface.

The arithmetical mean height surface area roughness, Sa, as used herein may be measured in accordance with ISO 25178-2:2012 using a laser profiler.

The surface of the 3D printed object can be coated with a UV absorbing colorant using a variety of techniques. The surface may be partially or completely coated with the UV absorbing colorant.

The UV absorbing colorant can be selectively coated onto the surface. This is to achieve a smooth surface in desired areas of the 3D printed object.

Generally, the surface is coated with a solution or a dispersion of the UV absorbing colorant. The solution or the dispersion may, for example, be aqueous.

In one example, the surface is coated by printing the UV absorbing colorant, such as a solution or a dispersion of the UV absorbing colorant, onto the surface of the 3D printed object. The UV absorbing colorant can be printed onto the surface by inkjet printing. The solution or dispersion of the UV absorbing colorant can be formulated as an ink.

In another example, the surface is coated by spraying the UV absorbing colorant onto the surface of the 3D printed object. The UV absorbing colorant may be sprayed as a particle powder onto the surface, such as with a liquid or gaseous carrier. Alternatively, the UV absorbing colorant may be sprayed as a solution onto the surface.

In a further example, the surface is coated by dipping the 3D printed object into a solution or a dispersion of the UV absorbing colorant.

In another example, the surface may be coated by sputtering particles of the UV absorbing colorant onto the surface or by painting the UV absorbing colorant, such as a solution or a dispersion of the UV absorbing colorant, with, for example, a brush.

In a further example, the surface may be coated by painting it with a paint containing the UV absorbing colorant When the surface is coated by printing the UV absorbing colorant, then the thickness of the coating can be controlled by the number of print passes that are used to apply the coating.

When using the spraying or dipping methods to coat a surface of the 3D printed object, the thickness of the coating can be controlled by changing the concentration of UV absorbing colorant in, for example, the solution or by varying time that the object is exposed to the spray or the dipping solution.

The UV absorbing colorant is, in general, a material or a compound that is optically transparent and UV absorbent, such in the near-UV region of the electromagnetic spectrum. The UV absorbing colorant can be visible colorant, a white colorant or a transparent colorant in the visible part of the electromagnetic spectrum.

In general, the UV absorbing colorant may be a metal oxide, an organic compound or a combination thereof.

In one example, the UV absorbing colorant is a metal oxide or a combination of a metal oxide and an organic compound. The combination of the metal oxide and the organic compound may be a mixture.

In another example, the UV absorbing colorant is a metal oxide. Thus, the metal oxide is the only UV absorbing colorant.

The metal oxide may be selected from $TiO_2$, $ZnO$, $CeO_2$, $SnO_2$, $Cu_2O$, $In_2O_3$ and indium tin oxide (ITO).

The metal oxide may, for example, be selected from $TiO_2$, $ZnO$ and $CeO_2$. In one example, the metal oxide is $TiO_2$ or $ZnO$, such as $TiO_2$. $TiO_2$ and $ZnO$ are common compounds, which are low cost, commercially available products that are qualified as being non-toxic and environmentally friendly. $TiO_2$ absorption is negligible in the visible and rapidly increases in the UV range. ZnO and $CeO_2$ exhibit similar absorption spectra.

The metal oxide may be in the form of particles.

In one example, the particles of the metal oxide have a mean particle size of about 1 nm to about 100 nm, such as about 5 nm to about 50 nm. When the mean particle size is in this range, then the particles of the metal oxide may be transparent.

In another example, the particles of the metal oxide have a mean particle size of greater than 100 nm to about 1 µm, such as about 200 nm to about 750 nm or about 250 nm to about 500 nm.

The reference to a "particle size" as used herein refers to the particle diameter of the particles. The particle diameters of the particles described herein refer to a volume-based measurement. Such measurements can be made by particle size analysers that use a laser diffraction/scattering method or dynamic light scattering.

The organic compound may be selected from methyl-4-hydroxybenzoate, 2-hydroxy-4-methoxybenzophenone, salicylic acid, 1,4-bis(5-phenyl-2-oxazolyl) benzene, 2-(2-hydroxyphenol)-benzotriazole, 2,2'-dihydroxy-4-methoxybenzophenone, 3-hydroxyacetophene, quinine sulfate, vitamin K1 (phylloquinone), 8-anilino-1-napthalenesulfonic acid, DAPI (4',6-diamidino-2-phenylindole), perylene, anthracene, 9,10-bis(phenylethynyl)anthracene, 1,4-naphthoquinone, TCNQ (7,7,8,8-tetracyanoquinodimethane), 1,4-naphthoquinone-2-sulfonic acid potassium salt, carbon black, quinacridone, phthalocyanine green G (Cu phthalo green) and a combination thereof.

In one example, the organic compound is methyl-4-hydroxybenzoate, 2-hydroxy-4-methoxybenzophenone or salicylic acid.

When a metal oxide is a component of the UV absorbing colorant, then at least 10% of the surface is coated with the metal oxide. The coating may be applied to coat from about 10% to 50% of the surface.

The UV absorbing colorant should be present as a solid coating before the surface is irradiated with UV light. If a solution or a dispersion of the UV absorbing colorant is coated onto the surface, then the surface should be dried.

The surface may be dried, for example, by heating the surface and/or allowing the liquid to evaporate from the surface.

The method of the present disclosure involves irradiating a surface of a 3D printed object with UV light to form a melted surface. The surface that is irradiated is the surface coated with the UV absorbing colorant. This is referred to herein as the "coated surface".

The purpose of irradiating the coated surface of the 3D object with UV light is to cause melting of the polymer at the surface using the UV absorbing colorant. When the UV absorbing colorant is exposed to UV light, it is electronically excited and produces heat to cause melting of the polymer at the surface of the 3D printed object. Once the polymer at the surface has melted, it is allowed to reflow and level off, thereby forming a smooth surface once it has re-solidified.

For the avoidance of doubt, this is not a fusing step, such as used during the 3D printing process.

In general, before irradiation with UV light, the coated surface of the 3D printed object is a solid surface.

The coated surface of the 3D printed object may be irradiated with UV light having a wavelength of from about 300 nm to about 405 nm, such as from about 340 nm to about 400 nm. In one example, the UV light has a wavelength of from about 360 nm to about 405 nm, such as about 370 nm to 400 nm.

UV light having a power of about 5 $W/cm^2$ to about 10 $W/cm^2$ may be used to irradiate the coated surface. In one example, the UV light has a power of about 6 $W/cm^2$ to about 10 $W/cm^2$.

The coated surface of the 3D printed object may be irradiated with UV light for about 0.2 to about 4.0 seconds, such as about 1.0 to 2.0 seconds.

The UV light may be provided by an array of UV LEDs. High power near-UV LEDs arrays are commercially available at low cost. The UV LEDs can be obtained in a large number of array geometries, in high emission power, and in a variety of emission wavelengths. There is a large overlap between the absorption spectra for polymers commonly used in 3D printing, such as described above, and the emission spectra of commercially available UV LEDs. This overlap indicates that the UV emission from UV LEDs is highly effective for the heating of polymers at the surface of a 3D printed object.

In general, the coated surface of the 3D printed object is uniformly irradiated with the UV light. This is to ensure that the UV light, and the resulting heat that is generated, is evenly distributed over the surface.

To ensure efficient surface smoothing by UV light, every part of the irradiated surface should receive the same irradiation dose. Since 3D printed objects can have complex shape, the irradiation source may need to provide illumination conditions that are identical at each point of irradiated surface.

The UV light may be provided by a plurality of UV light sources arranged on a surface of a device, which is arranged to surround the coated surface of the 3D printed object.

For example, the coated surface of the 3D printed object may be uniformly irradiated with UV light using an array of UV LEDs arranged to surround or partially surround the coated surface. The UV LEDs may be arranged on a surface of, for example, an ovoid shaped cover for surrounding or partially surrounding the coated surface of the 3D printed object.

Uniform irradiation of the coated surface of the 3D printed object with UV light may also be achieved by moving the UV light source, such as the array of UV LEDs, relative to the coated surface of the 3D printed object. The 3D printed object may, for example, be mounted on a turntable with the coated surface of the 3D printed object located under the UV light source.

Irradiation of the coated surface with UV light does not heat the body of the 3D printed object. If a surface or the 3D printed object itself is to be irradiated with UV light multiple times, then it is unnecessary to include rest periods between successive irradiations to allow the body of the 3D printed object to cool.

The coated surface of 3D printed object may be irradiated with UV light to partially or completely melt the surface. When the coated surface is partially melted, then parts of the surface may remain solid.

Generally, the coated surface is melted to cause the polymer to reflow over the surface. When the polymer reflows over the surface, it may flatten or level off.

Irradiation with UV light may melt the coated surface of the 3D printed object to a depth of from about 1 pnm to about 100 µm, such as about 5 µm to about 50 µm or from about 10 µm to about 40 µm.

In the present disclosure, the method involves solidifying the melted surface of the 3D printed object. The final 3D printed object is then obtained.

When the coated surface is partially melted, then the partially melted surface of the 3D printed object is solidified.

The melted surface of the 3D printed object may be solidified by allowing the surface to cool. The surface may be allowed to solidify without being disturbed.

The melted surface is solidified to achieve a flat or a smooth surface.

The smooth surface may have a surface area roughness Sa (arithmetical mean height) of s 5.0 µm, such as from about 0.5 µm to about 5.0 µm or from 1.0 µm to 4.0 µm.

The method of the present disclosure may include forming the 3D printed object by multi-jet fusion (MJF), before irradiating a surface of the 3D printed object with UV light.

The 3D printed object of the present disclosure, which may be obtained from the method, has a surface area roughness Sa (arithmetical mean height) of ≤5.0 µm, such as from about 0.5 µm to about 5.0 µm or from 1.0 µm to 4.0 µm.

As a consequence of the method of the present disclosure, the surface comprises the UV absorbing colorant, such as the metal oxide described herein.

In one example, the surface of the finished 3D printed object may comprise particles of the metal oxide having a mean particle size of about 1 nm to about 100 nm, such as about 5 nm to about 50 nm.

In another example, the surface of the finished 3D printed object may comprise particles of the metal oxide have a mean particle size of greater than 100 nm to about 1 µm, such as about 200 nm to about 750 nm or about 250 nm to about 500 nm.

Generally, the surface of the finished 3D printed object comprises a higher concentration of the metal oxide than the concentration of the metal oxide in the body of the finished 3D printed object.

The surface of the finished 3D printed object may have a depth of from about 1 µm to about 100 µm, such as about 5 µm to about 50 µm or from about 10 µm to about 40 µm.

Figure 2:
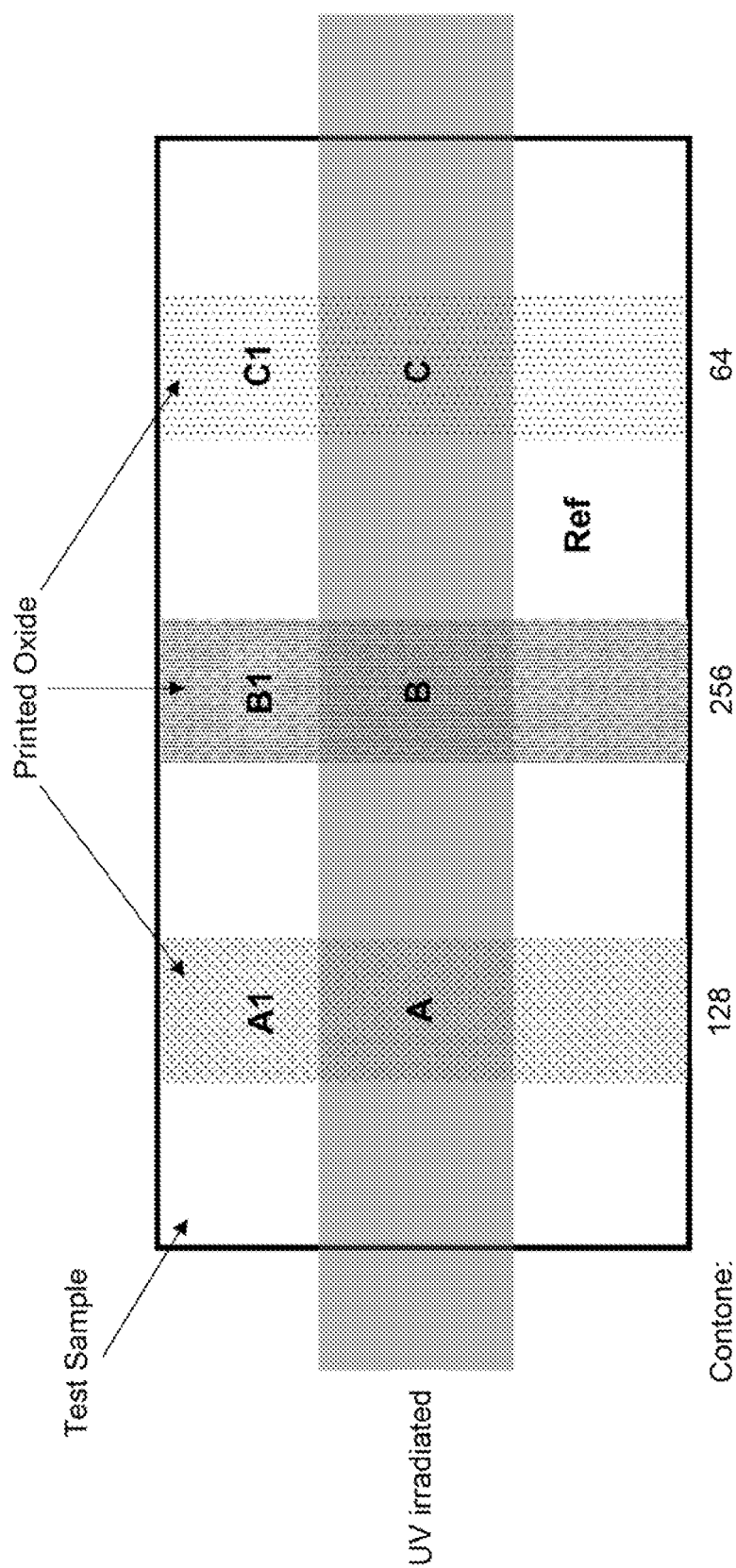
FIG. 2 is a schematic diagram of a sample as tested in the examples with coatings in the form of strips of varying thicknesses.

Turning more specifically to the figures, FIG. 1 shows a flow chart with an example of the method. FIG. 2 is a schematic diagram of a sample as tested in the examples with coated strips of varying thickness.

FIG. 3 shows a schematic side view of an initial 3D printed object (102) in a first state (200) after being printed and prior to performing a method of the present disclosure.

As shown in FIG. 3, the 3D printed object (102) may be formed through, for example, a MJF process in which powder particles are fused together through application of a fusing agent and heat. Powder particles (206) at a surface (208) of the 3D printed object (102) may not have fully coalesced with the main body (204) of the 3D printed object (102). Excess powder particles (112, 202) may have also adhered or fused to the surface (208) of the 3D printed object (102). Both the partially fused powder particles (206) and the excess powder particles (112, 202) adhered to the surface (208) cause the surface (208) of the 3D printed object (102) to have a higher surface roughness than desired.

FIG. 4 shows a schematic side view of a 3D printed object (102) in a second state (300) after performing various steps of the post-print method of the present disclosure.

The surface (208) is in a region (308) showing an uncoated surface of the 3D printed object (102). The surface in this region (306) corresponds to the surface of the initial 3D printed object (102) as shown in FIG. 3.

In another region (304) of the 3D printed object (102), the surface (208) is coated with an UV absorbing colorant (308), which in this case contains particles of a metal oxide. The particles of the metal oxide are distributed over the surface (208) of the 3D printed object (102) in region (304).

The surface (208) in region (302) was also coated with the organic colorant. In region (302), the surface (208) of the 3D printed object (102) is irradiated with UV light (108) to decrease a surface roughness of the surface (208) in the region (302). In FIG. 4, for example, the UV absorbing colorant (308) absorbs the UV light (108) and generates heat, which is used to melt a portion of the surface (208). This causes the partially fused powder particles (206) and the excess adhered powder particles (112, 202) to melt and reflow. When the melted particles have solidified, a smoother surface is formed. The UV absorbing colorant (308) will be dispersed amongst the melted polymer particles at the surface of the 3D printed object (102). When the melted surface re-solidifies, the UV absorbing colorant (308) will be dispersed throughout the surface of 3D printed object (102).

The amount of UV absorbing colorant (308) and the intensity (e.g. at an energy level, at a speed, and/or for a duration of time) of UV light (108) are sufficient to cause the partially fused powder particles (206) and the excess adhered powder particles (112, 202) to melt and flow without causing the underlying main body (204) of the 3D printed object (102) to melt. The excess adhered powder particles (112, 202) in region (302) will, for example, start to flow and fill surface voids and/or depressions. As a result, the surface roughness in selected region (302) of the surface (208) will be reduced.

Unlike methods that remove material from a surface of a 3D printed object, such as using chemical etching to remove unwanted surface particles, the surface (208) of the 3D printed object (102) is treated by re-melting the surface (208).

Only a relatively small amount of energy from the source of UV light (108) is needed to excite the UV absorbing colorant (308) to generate heat that melts the partially fused powder particles (206) and the excess adhered powder particles (112, 202). This means that the main body (204) of the 3D printed object (102) is not heated, which avoids distorting the shape and/or the dimensional profile of the 3D printed object (102). When the main body of the 3D printed object (102) is heated, then the polymer in the main body (204) may become soft and can sag. Also, air bubbles trapped within the main body (204) may expand. These distortive effects can be avoided by the method of the present disclosure because the main body (204) is not heated.

FIG. 4 shows the irradiation of a region (302) of the surface (208) with UV light (108), a coated region (304) that has not been irradiated and an uncoated region (306). It should be understood these regions (302, 304, 306) are shown in FIG. 4 to schematically show the difference between the surface characteristics of these regions. An entire surface of the 3D printed object (102) may, however, be coated with a UV absorbing colorant and irradiated with UV light (108), instead of only a region (302), to ensure that a smooth surface is obtained.

FIGS. 3 and 4 show the position of the 3D printed object (102) with respect to the source of UV light (108). By way of example, after irradiating the region (302) with UV light, the orientation of the 3D printed object (102) with respect to the source of UV light (108) may be changed, so that a different coated surface of the 3D printed object (102) may be irradiated with the UV light (108).

EXAMPLES

The present disclosure will now be illustrated by the following non-limiting examples.

Example 1

Sample Preparation

A series of flat, rectangular samples were 3D printed by MJF using a PA12 polymer powder as the build material. An aqueous ink containing 20 wt % of either $TiO_2$ or ZnO was selectively printed onto the samples at 600 dpi and a drop size of 10 µL.

Each oxide coating (i.e. ink) was printed onto a sample in a series of strips, where each strip was coated using a varying number of pen passes to provide different coating thicknesses. A 64 contone level was obtained with 1 pass of the ink pen, a 128 contone level was obtained with 2 passes of the ink pen and a 256 contone level was obtained with 3 passes of the ink pen. While printing the oxide coating, the polymer surface was kept at around 60° C. to 70° C. to ensure quick removal of most liquid ink components.

For both the $TiO_2$ and ZnO, the thin coatings were transparent, but some color change was observed (white in case of $TiO_2$ and slightly yellow in case of ZnO) when the contone level exceeded 256. Since a change in color is usually undesirable, the coatings have a contone level of 256 or less were tested further.

UV Irradiation

A section of the coated strips on each sample was irradiated with UV light (395 nm) for a specific exposure time and UV power using an array of UV-LEDs (model Phoseon FJ200). The wavelength of 395 nm was selected to fall into the range where absorption of PA12 remains low. The exposure time and/or UV was varied among the samples. The radiation energy was tuned by adjusting the LED current with a simple potentiometer circuit.

Figure 5:
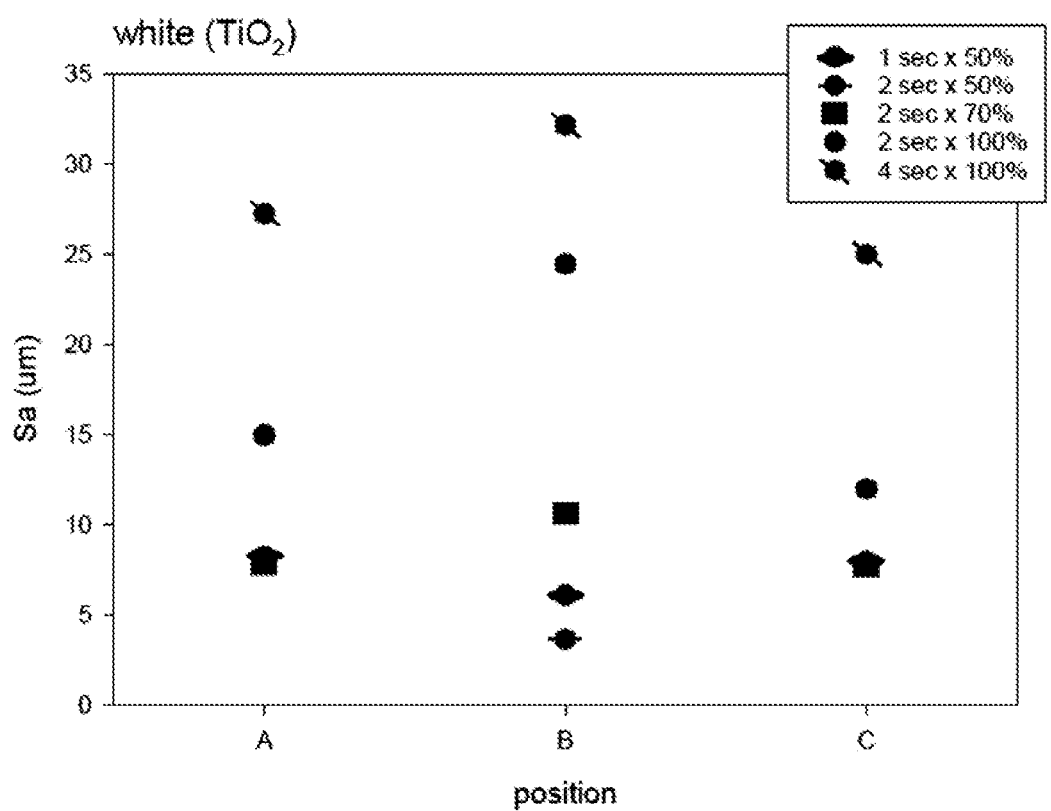
FIGS. 5 and 6 are graphs showing the evolution of surface roughness Sa as a function of coating thickness for examples of a 3D printed object.
Figure 6:
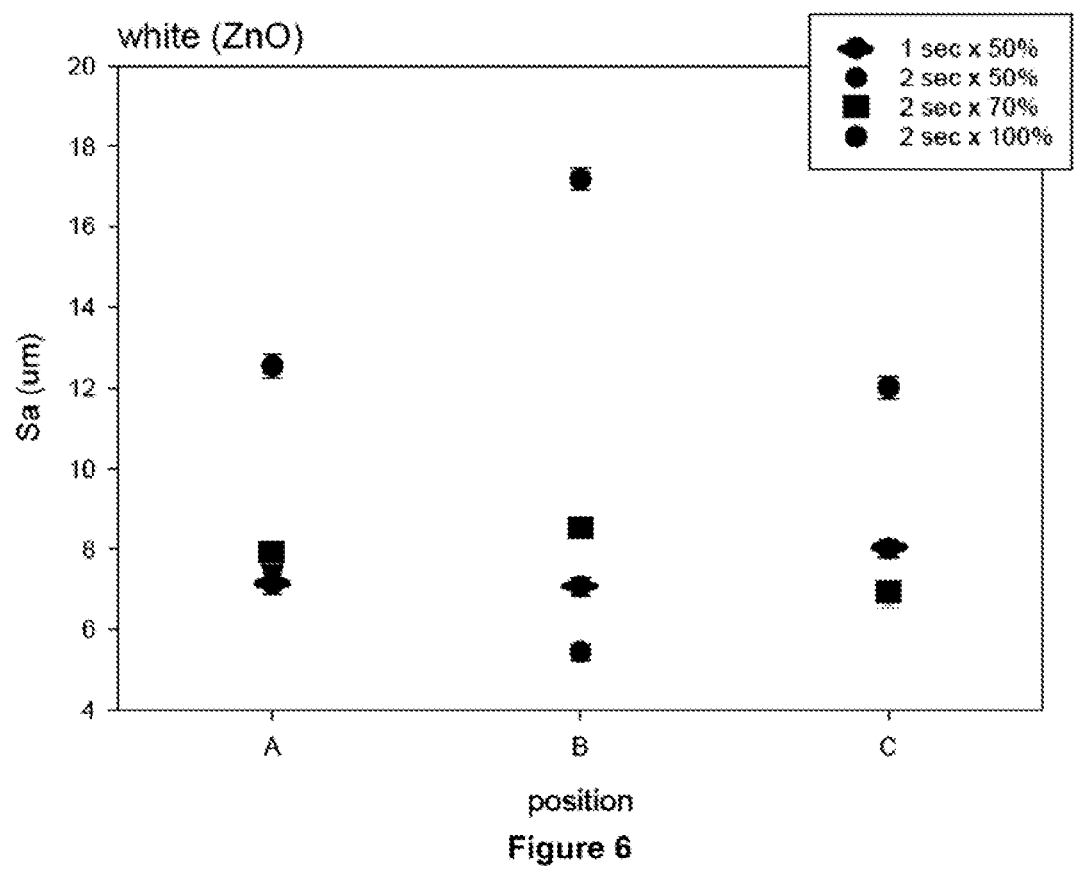

The reference to, for example, "100%" in FIGS. 5 and 6 relates to "100% UV", which indicates the maximum irradiation that was permitted by the UV LED source that was used. This was about 10 $W/cm^2$. The expression "50%" therefore refers to 50% of the maximum value, which is 50% of 10 $W/cm^2$.

A schematic of an irradiated, coated sample with three strips of coating is shown in FIG. 2. The meaning of the labels in FIG. 2 that identify the coated parts of the sample is shown in Table 1 below.

TABLE 1

| Region | Ref | A | A1 | B | B1 | C | C1 |
|---|---|---|---|---|---|---|---|
| Contone | 0 | 128 | 128 | 256 | 256 | 64 | 64 |
| Irradiated | No | Yes | No | Yes | No | Yes | No |

Surface Measurements

Surface topography was evaluated with a Keyence VK-X200 laser profiler either in the form of topography maps or by calculating mean surface roughness.

By comparing the topography maps or the roughness values it can be determined whether the combination of an oxide coating and UV exposure could provide a smoother surface on a 3D printed object. The surface roughness was measured in terms of an arithmetical mean height as represented by $$S_a = \frac{1}{A}\int\int_A |Z(x, y)|dxdy.$$

This parameter is the mean of the absolute value of the height of points within the defined area. The measurements of surface roughness, including the measurement of the surface area roughness Sa (arithmetical mean height), were performed in accordance with ISO 25178-2:2012.

Results

The results for the Sa in each area on the samples are shown in FIGS. 5 and 6.

The Sa of the initial surface of the 3D printed polymer object (i.e. at position "Ref") was about 8 to 15 µm. Similarly, the Sa of the non-irradiated coated surface (i.e. at positions "A1", "B1" and "C1") ranged from 8 to 15 µm.

FIG. 5 shows the results for the $TiO_2$ containing coating. Excellent surface smoothness (Sa<5 µm) was obtained at position B (256 contone) when the surface was irradiated at 50% UV for 2 seconds. Improvements in the smoothness of the surfaces were also obtained when the surfaces were irradiated from 1 second at 50% UV to 2 seconds at 70% UV (see the results at positions A, B and C).

In most instances, an exposure time of at least 2 seconds at 100% UV resulted in an increase in surface roughness. Continued heating may initiate the formation of a thick liquified layer, in which local instabilities may lead to formation of convection currents growing with extended irradiation. If the surface is allowed to re-solidify at this stage, then it will be rough and have a macroscopic valleys-and-hills appearance, which reflect the presences of convection currents.

FIG. 6 shows the results for the ZnO containing coating. Like the $TiO_2$ containing coating, excellent surface smoothness (Sa<5 µm) was obtained at position B (256 contone) when the surface was irradiated at 50% UV for 2 seconds. Improvements in the smoothness of the surfaces were also obtained when the surfaces were irradiated from 1 second at 50% UV to 2 seconds at 70% UV (see the results at positions A, B and C).

However, an exposure time of at least 2 seconds at 100% UV did not improve the smoothness of the surface and, in some cases, resulted in an increase in surface roughness.

The invention claimed is:

1. A three-dimensional (3D) printed object comprising a 3D printed body consisting of fused polymer particles, wherein the 3D printed body has an outer surface coated with a UV absorbing colorant that consists of a metal oxide, wherein the 3D printed object has a surface area roughness Sa (arithmetical mean height) of ≤5.0 µm.

2. The 3D printed object of claim 1, wherein the metal oxide is selected from the group consisting of $TiO_2$, ZnO, $CeO_2$, $SnO_2$, $Cu_2O$, $In_2O_3$, and indium tin oxide (ITO).

3. The 3D printed object of claim 2, wherein the outer surface of the 3D printed body comprises particles of the metal oxide having a mean particle size of from about 1 nm to about 100 nm.

4. The 3D printed object of claim 2, wherein the outer surface of the 3D printed body comprises particles of the metal oxide having a mean particle size of from greater than 100 nm to about 1 µm.

5. The 3D printed object of claim 1, wherein a polymer of the fused polymer particles is a thermoplastic polymer.

6. A method for manufacturing a three dimensional (3D) printed object having a smooth surface, the method comprising:

forming an initial 3D printed object including a body having a surface, wherein the body consists of fused polymer particles;

coating the surface of the body with a UV absorbing colorant that consists of a metal oxide;

irradiating the surface of the body with UV light to melt the fused polymer particles of the coated surface; and solidifying the melted polymer particles to achieve a surface area roughness Sa (arithmetical mean height) of the 3D printed object of ≤5.0 µm.

7. The method of claim 6, wherein the metal oxide is selected from the group consisting of $TiO_2$, ZnO, $CeO_2$, $SnO_2$, $Cu_2O$, $In_2O_3$, and indium tin oxide (ITO).

8. The method of claim 6, wherein the UV light has a wavelength of from about 300 nm to about 405 nm.

9. The method of claim 6, wherein the UV light has a power of about 5 to about 10 $W/cm^2$.

10. The method of claim 6, wherein the irradiating of the surface with the UV light occurs for about 0.2 to about 4 seconds.

11. The method of claim 6, wherein the UV light is provided by an array of UV LEDs.

12. The method of claim 6, wherein the surface is uniformly irradiated with the UV light.

13. The method of claim 12, wherein the UV light is provided by an array of UV LEDs arranged to surround or partially surround the surface.

14. The method of claim 6, wherein a polymer of the fused polymer particles is a thermoplastic polymer.

15. The method of claim 6, wherein the coating of the surface of the body includes printing the UV absorbing colorant onto the surface of the body.

16. The 3D printed object of claim 1, wherein the UV absorbing colorant is dispersed among the fused polymer particles at the outer surface of the body.

17. The 3D printed object of claim 1, wherein the UV absorbing colorant is dispersed throughout the outer surface of the 3D printed body.

18. The 3D printed object of claim 1, wherein:
the fused polymer particles are fused polyamide 12 particles;
the metal oxide is $TiO_2$ or ZnO; and
the coated UV absorbing colorant has a contone level of 256 or less.

* * * * *